(12) United States Patent
Kabbes et al.

(10) Patent No.: US 9,333,849 B2
(45) Date of Patent: May 10, 2016

(54) CO-INJECTED SEALING STRUCTURE OF AN AIR RECIRCULATION PREVENTION DEVICE

(71) Applicant: HONDA MOTOR CO., LTD., Tokyo (JP)

(72) Inventors: Ryan L. Kabbes, Delaware, OH (US); Cole Charles Pearson, Dublin, OH (US); Kyle S. Mihok, Hilliard, OH (US); Steve Faria, Marysville, OH (US); Manabu Ishizono, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/445,425

(22) Filed: Jul. 29, 2014

(65) Prior Publication Data

US 2016/0031312 A1 Feb. 4, 2016

(51) Int. Cl.
*B60K 11/08* (2006.01)
(52) U.S. Cl.
CPC ...................................... *B60K 11/08* (2013.01)
(58) Field of Classification Search
CPC . B60R 2019/527; B62D 25/084; B60K 11/08
See application file for complete search history.

(56) References Cited

U.S. PATENT DOCUMENTS

| 4,566,407 A | 1/1986 | Peter |
| 4,938,303 A | 7/1990 | Schaal et al. |
| 5,269,264 A | 12/1993 | Weinhold |
| 6,622,808 B2 | 9/2003 | Sasano et al. |
| 8,434,579 B2 | 5/2013 | Widmer |
| 2006/0102109 A1 | 5/2006 | Becker et al. |
| 2011/0132677 A1* | 6/2011 | Kawahira ............... B60K 11/08 180/68.1 |
| 2012/0248824 A1 | 10/2012 | Fujiu et al. |
| 2013/0244562 A1 | 9/2013 | Maurer et al. |
| 2015/0068825 A1* | 3/2015 | Berthevas ............... B60K 11/04 180/68.1 |

FOREIGN PATENT DOCUMENTS

| EP | 2 332 764 B1 | 6/2013 |
| GB | 2 343 740 A | 5/2000 |
| GB | 2 497 760 A | 6/2013 |

\* cited by examiner

*Primary Examiner* — Joseph Rocca
*Assistant Examiner* — Bryan Evans
(74) *Attorney, Agent, or Firm* — Kenealy Vaidya LLP

(57) ABSTRACT

An airflow directing assembly and associated method of assembling same, includes an air deflector having a first portion mounted in the vehicle engine compartment rearwardly of the bumper beam and including a separating wall that extends between and segregates a first, upper air flow path from a second, lower air flow path. The airflow directing assembly includes a second, flexible seal portion extending from the air deflector first portion in a direction toward the bumper beam. The flexible seal portion is configured for sliding, sealing engagement with a surface of a vehicle engine compartment component such as the bumper beam to accommodate build variation during vehicle assembly.

17 Claims, 3 Drawing Sheets

CO-INJECTED SEALING STRUCTURE OF AN AIR RECIRCULATION PREVENTION DEVICE

BACKGROUND

The present disclosure generally relates to an air-flow assembly for a vehicle engine compartment, and more particularly to an airflow directing member for a vehicle engine compartment that addresses inefficiencies and accommodates variations encountered during assembly of vehicles, as well as an associated method of forming an air separator assembly for an associated vehicle engine compartment. It is to be appreciated that the present exemplary embodiment is also amenable, however, to other like applications that encounter similar problems or require similar solutions.

To facilitate cooling of a vehicle engine components, ram airflow is advantageously used during vehicle motion. More specifically, vehicle ram airflow openings may be positioned on the vehicle to receive an airflow that is directed toward and impacting the vehicle while the vehicle is in motion (ram airflow), and may introduce the ram airflow into the vehicle engine compartment. The ram airflow may be directed at a relatively high rate of speed proportional to a speed of movement of the vehicle, and can facilitate cooling the vehicle engine components due to the cooling effect of the relatively high-speed airflow.

The vehicle engine compartment, however, may not be efficiently configured or arranged to fully take advantage of the ram airflow cooling effect, for example, due to a lack of an optimized aerodynamic and/or airflow directing design within the vehicle engine compartment. Particularly, the vehicle engine compartment may include areas or regions along one or more ram airflow paths which may be susceptible to becoming low pressure areas or regions. These low pressure areas or regions may allow or encourage ram airflow to leak from a desired ram airflow path or to recirculate within the vehicle engine compartment, thereby reducing the efficiency of cooling by the introduced ram airflow. Moreover, even if some manner of ram airflow direction is provided in the vehicle engine compartment, the mechanism for ram airflow direction may not be optimally positioned or configured to reduce or eliminate the problematic low pressure areas or regions. Commonly owned, published application US 2013/0244562A1 provides an airflow directing member for a vehicle engine compartment which is secured, for example, to a member between a vehicle bumper beam and a vehicle radiator. The disclosure of this commonly owned US published application is expressly incorporated herein by reference.

The air circulation prevention device, developed in an attempt to recover airflow necessary to cool critical engine components for heat resistance durability, re-directs airflow from the bumper lower opening, as well as preventing lower bumper airflow mixing with airflow from the front grill. This arrangement attempts to provide the most efficient, non-turbulent airflow through the condenser and radiator. Unfortunately due to the inherent construction and body attachment method of this air separator, there is the potential for variation in its final setting position relative to the vehicle body. Therefore, a sealing structure is necessary to provide good sealing to the bumper beam and to prevent inefficiencies in air flow direction.

This disclosure remedies these problems in a simple, reliable, effective, and inexpensive manner.

BRIEF DESCRIPTION

An airflow directing assembly for a vehicle engine compartment is provided that separates airflow between first and second flow paths.

The airflow directing assembly includes an air deflector having a first portion mounted in the vehicle engine compartment rearwardly of the bumper beam and including a separating wall that extends between and segregates the first, upper air flow path from the second, lower air flow path. The airflow directing assembly also includes a second, flexible seal portion extending from the air deflector first portion in a direction toward the bumper beam, the flexible seal portion configured for sliding, sealing engagement with a surface of a vehicle engine compartment component such as the bumper beam to accommodate build variation during vehicle assembly.

The second, flexible seal portion is made from a different material than the air deflector first portion.

The second, flexible seal portion is made from a different material that is more flexible than the air deflector first portion.

The second, flexible seal portion has a curved conformation as the second portion extends outwardly from the air deflector first portion.

The second, flexible seal portion is mounted to contact the bumper beam in a non-perpendicular orientation.

The second, flexible seal portion is made from a rubberized material in a preferred arrangement.

The air deflector first portion is made from a rigid plastic material in a preferred arrangement.

The second, flexible seal portion has a predetermined conformation that urges a terminal end of the second, flexible seal portion into abutting sealing engagement with the bumper beam.

The air deflector first portion and the second, flexible seal portion are a single piece construction.

The first and second materials are co-injected to form a single piece component.

A method of forming an air separator assembly is disclosed for an associated vehicle engine compartment that includes an associated bumper beam where the airflow separator assembly separates airflow between first and second flow paths. The method includes providing an air deflector having a rigid, first portion and a flexible, second seal portion. Further, the method includes mounting the air deflector in the vehicle engine compartment rearwardly of the associated bumper beam such that the air deflector extends between and segregates the first, upper air flow path from the second, lower air flow path.

The method additionally includes curving the flexible, second seal portion toward the associated bumper beam.

The method includes mounting the air deflector such that the flexible, second seal portion is in sliding, sealing engagement with a surface of the associated bumper beam.

The providing step includes co-injecting the first and second seal portions.

A primary benefit of the present disclosure includes eliminating inefficiencies in air flow amount and air flow direction.

Another advantage resides in optimizing the air flow direction.

Still another benefit is associated with a sealing structure that accommodates all of the potential build variations that occur in connection with the construction of both individual components and the complete vehicle system.

Still other benefits and advantages will become apparent to those skilled in the art after reading and understanding the following detailed description.

DETAILED DESCRIPTION

Figure 1:
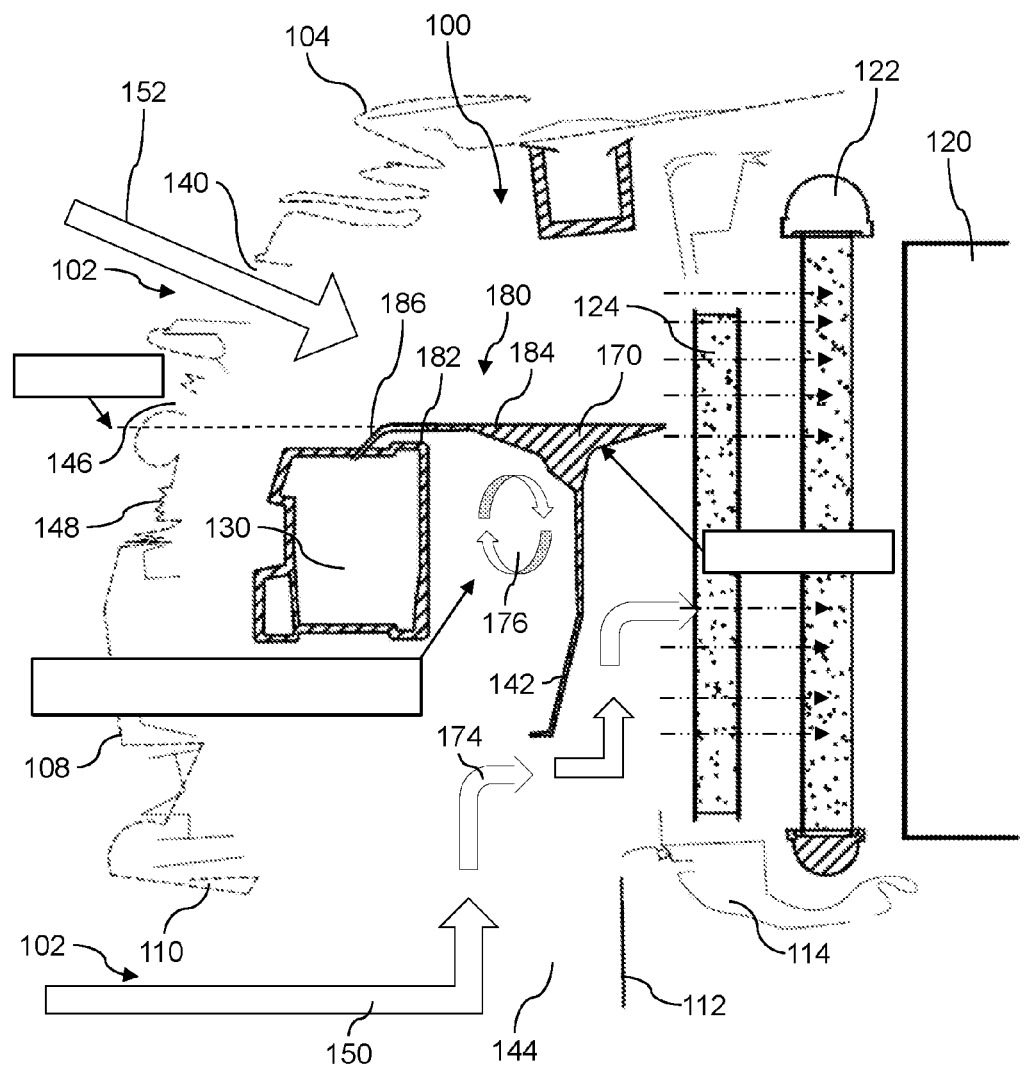
FIG. 1 is a side-sectional view of a vehicle engine compartment having an airflow directing member or air separator.

The description and drawings herein are merely illustrative in various modifications and changes can be made in the structures disclosed without departing from what is defined in the appended claims. All references to direction and position, unless otherwise indicated, refer to the orientation of the structures and components illustrated in the drawings and should not be construed as limiting the claims appended hereto. Like numbers refer to like parts throughout the several views.

Figure 2:
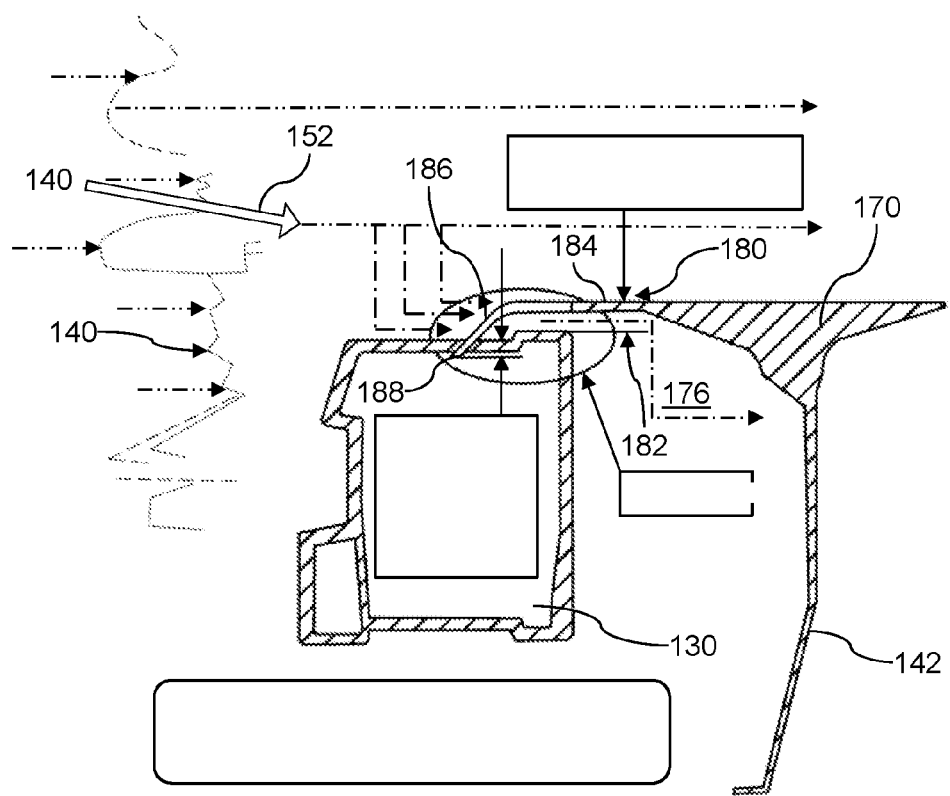
FIG. 2 is an enlarged detail view of a portion of FIG. 1.
Figure 3:
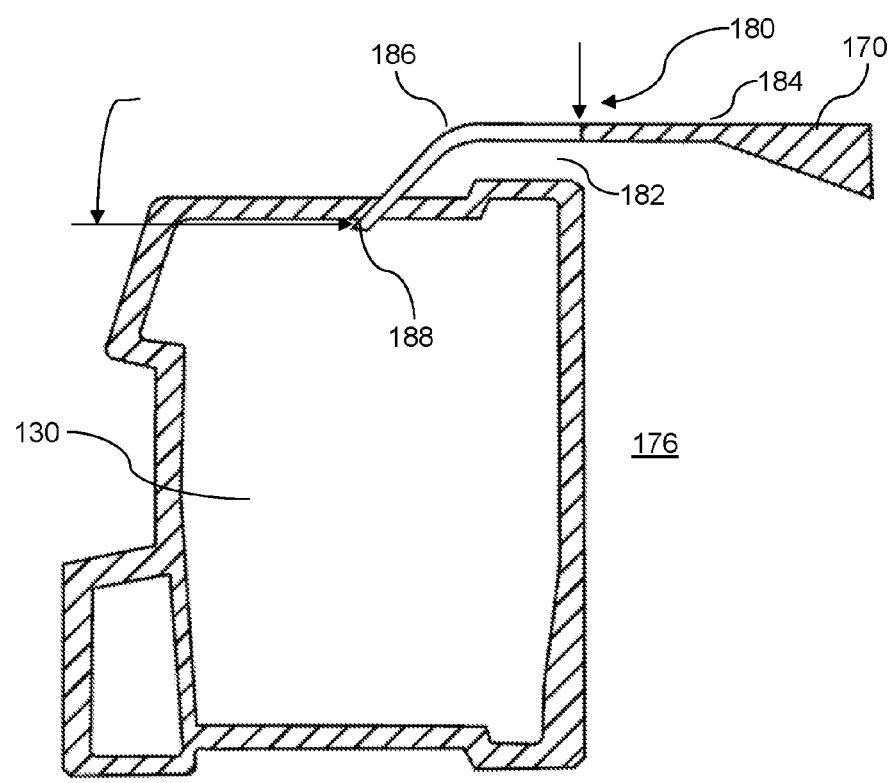
FIG. 3 is a further enlarged view more particularly illustrating first and second portions of the air separator.

With reference to FIGS. 1-3, a vehicle engine compartment 100 is provided with an airflow introducing and directing system 102. The vehicle engine compartment 100 defines a substantially enclosed area which, as illustrated, is bounded at an upper end by a vehicle engine compartment upper surface 104, at a forward end by a vehicle engine compartment forward surface 108, at a first or left side by a first or left side surface (not shown), and likewise at a second or right side by a second or right side surface (not shown). Oftentimes, the upper surface 104 is a vehicle engine compartment closing member such as a vehicle hood or bonnet, the forward surface 108 may be a front fascia, and the left and right side surfaces may be vehicle fenders. A lower end 110 of the vehicle engine compartment 100 may be at least partially formed by a lower part of the forward surface 108, and at a rear end by an air dam 112 which projects downwardly from a lower bulkhead 114.

A vehicle engine 120 is mounted and housed within the vehicle engine compartment 100. A vehicle engine radiator 122 is also mounted and housed within the vehicle engine compartment 100 at a position forward of the vehicle engine 120. Other vehicle components may also be mounted in the vicinity of the vehicle radiator 122, e.g., a condenser 124 may be provided at a position forward of the vehicle radiator 122. A vehicle bumper beam 130 is provided at a forward end of the vehicle engine compartment 100 in the vicinity of the forward surface 108. As illustrated, the vehicle bumper beam 130 is preferably housed entirely within the vehicle engine compartment 100. It is to be appreciated that the vehicle bumper beam 130 may alternatively protrude from the forward end of the vehicle engine compartment 100 or the forward surface 108 thereof, and/or be formed as part of the vehicle engine compartment forward surface 108, e.g. integrated with the vehicle front fascia.

The operation and general structure of the vehicle engine 120, radiator 122, and condenser 124 are considered to be known in the art, and will therefore not be described in detail herein. It is noted that, during operation, the vehicle engine 120 may become heated, and the vehicle radiator 122 and condenser 124 may operate to cool the vehicle engine. The airflow introducing and directing system 102 is described herein as being provided to facilitate the cooling operation of the vehicle radiator 122, though it is to be appreciated that the airflow introducing and directing system 102 may be provided to facilitate cooling of other vehicle components (e.g., the vehicle engine, vehicle brakes, etc.). The airflow introducing and directing system 102 includes airflow introducing ports 140 formed to introduce a ram airflow into the vehicle engine compartment 100, as well as an airflow directing member 142 for directing the airflow introduced into the vehicle engine compartment 100 to the vehicle radiator 122 (or other desired vehicle components, as the case may be).

The airflow introducing ports 140 may include openings defined through the surfaces 104, 108 bounding the vehicle engine compartment 100, as well as gaps or spaces between these surfaces (e.g., the open area of the lower end of the vehicle engine compartment 100 may serve as airflow introducing ports 140). The airflow introducing ports 140 are formed to allow or encourage ram airflow to enter the vehicle engine compartment 100. As illustrated, the airflow introducing ports 140 include a bottom breather opening 144 and a front fascia opening 146.

The bottom breather opening 144 may be provided by the opened lower end of the vehicle engine compartment 100. Alternatively, for configurations wherein the lower end of the vehicle engine compartment 100 is bounded, the bottom breather opening 144 may be provided as an opening(s) formed through the structure bounding the lower end. For the purposes of the present disclosure, the bottom breather opening 144 will be considered the opened lower end of the vehicle engine compartment 100 bounded at a front end by the lower end 110 of the forward surface 108 of the engine compartment, and at a rear end by the air dam 112. The bottom breather opening 144 may have a front end disposed at a position rearward from the vehicle engine compartment forward surface 108 and below the vehicle bumper beam 130, and a rear end relatively forward from the vehicle radiator 122 and engine 120.

The front fascia opening 146 is one or more openings defined through the vehicle engine compartment forward surface 108. The front fascia opening 146 may be provided by way of a vehicle front fascia or grille 148 formed on an outer face of the forward surface 108. The front fascia opening 146, as illustrated, may be formed at a position entirely above the vehicle bumper beam 130, and the vehicle grille 148 may also be provided to be entirely above the vehicle bumper beam 130.

As configured, a bottom breather airflow path 150 is defined within the vehicle engine compartment 100 as a path which bottom breather air flow, introduced into the vehicle engine compartment 100 through the bottom breather opening 144, passes to reach the vehicle radiator 122. The bottom breather airflow path 150 may be a region of the vehicle engine compartment 100 bounded at a rearward end by the vehicle radiator 122, at a forward-upward end by a lower surface of the vehicle bumper beam 130, and at a forward end by the forward surface 108. The vehicle engine compartment 100 also defines a front airflow path 152 which is a path in which front airflow introduced into the vehicle engine compartment 100 through the front fascia opening 146 passes to reach the vehicle radiator 122. The front flow airflow path 152 may be a region of the vehicle engine compartment 100 bounded at a rearward end by the vehicle radiator 122 and at an upward end by the upper surface 104.

While bottom breather air flow reaches the vehicle radiator 122 via the bottom breather airflow path 150 and front airflow reaches the vehicle radiator via the front airflow path 152, it is noted that certain portions of the vehicle engine compartment 100 may be susceptible to becoming low pressure areas or regions, which may degrade the cooling performance of the air flows. There is the potential that bottom breather and front air flows may recirculate to low-pressure regions thereby degrading the volume and cooling performance of the ram air flows.

To improve the cooling performance of the ram air flows, an airflow directing member 170 is provided as part of the airflow directing member 142. Generally speaking, the airflow directing member 170 is an extending section that segregates the upper airflow path represented by arrow 152 and a lower airflow path 174. The airflow directing member 170 is generally disposed between the vehicle bumper beam 130 and the radiator 122/condenser 124. Previously, mixing would occur in the region 176. Moreover, the airflow directing member 170 has a first or front projection 180 that extends toward the front of the vehicle and generally terminates over the vehicle bumper beam 130. Thus front projection 180 is purposefully and typically located in spaced relation represented by 182 from the bumper beam in order to accommodate variations that may occur during assembly and/or tolerance variations of individual vehicle components. In the past, the gap could lead to undesired mixing between the upper airflow path 152 and the lower airflow path 174. This resulted in inefficient cooling.

To prevent the undesired mixing, the present disclosure provides an interference fit or sealing structure provided between the front projection 180 and the vehicle bumper beam 130. In particular, the front projection 180 is modified to allow for deformation resulting from part and build variation, as well as to prevent potential squeak and rattle where the front projection engages the vehicle bumper beam 130. The front projection 180 also serves an additional aesthetic function of limiting visibility of the vehicle bumper beam 130 through the grille openings.

The primary function of the front projection 180 is to re-direct airflow from the bumper lower opening, as well as prevent the lower bumper airflow from mixing with airflow from the front row (i.e., between the upper and lower flow paths) to enhance the efficiency and non-turbulent airflow through the condenser and radiator. The sealing structure and function provided by the front projection 180 of the airflow directing member 170 is enhanced in the present disclosure by using a co-injected seal that has a first portion 184 and a second, flexible portion 186 configured for sliding, sealing engagement with a surface of the bumper beam 130 to accommodate build variation during vehicle assembly. The first portion 184 is made from a different material than the air deflector second portion 186, for example, the first portion is made from a rigid plastic material (e.g., a harder, more rigid, polypropylene material) while the second, flexible seal portion is made from a rubberized material (e.g., a soft, flexible, rubberized TPV material). Of course other materials may also be used; however, the concept of different materials forming the front projection 180 of the airflow directing member 170 to satisfy different functions is desired.

One preferred manner of manufacturing the airflow directing member 170 is to co-inject or coextrude the structure. This allows the airflow directing member 170 to be a single part construction, i.e., no separate part or tooling or secondary assembly is required for attachment of the flexible, seal portion 186 to the more rigid, first portion 184. Nonetheless, this arrangement allows for much greater part and build variation due to the natural tendency of the seal portion 186 to bend and conform to surrounding system components such as the vehicle bumper beam 130. This assembly also assures that the seal portion 186 is maintained during assembly of the bumper beam. For example, an EPDM foam seal may not be visible to line assembly personnel and could potentially delaminate from a main air separator structure, whereas these issues are avoided with the present arrangement.

To enhance and assure the desired sealing contact—particularly where variation may occur due to component tolerances and assembly build variation—the second, flexible seal portion 186 has a predetermined conformation that urges a terminal end of the second, flexible seal portion into abutting sealing engagement with the bumper beam 130. The second, seal portion 186 has a predetermined curvature whereby a terminal end 188 of the seal portion is urged into sliding, sealing engagement with the associated bumper beam 130. By mounting the air deflector 170 in the vehicle engine compartment rearwardly of the associated bumper beam 130, the air deflector extends between and segregates the first, upper air flow path from the second, lower air flow path. The flexible, second seal portion 186 is preferably in sliding, sealing engagement with a surface of the associated bumper beam 130.

This written description uses examples to describe the disclosure, including the best mode, and also to enable any person skilled in the art to make and use the disclosure. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Moreover, this disclosure is intended to seek protection for a combination of components and/or steps and a combination of claims as originally presented for examination, as well as seek potential protection for other combinations of components and/or steps and combinations of claims during prosecution.

What is claimed is:

1. An airflow directing assembly for a vehicle engine compartment that defines transverse and vertical axes and includes an associated bumper beam, where the airflow directing assembly separates airflow between first and second air flow paths, the assembly comprising:
    an air deflector having a first portion mounted in the vehicle engine compartment rearwardly of the bumper beam including a separating wall that extends between and segregates the first, upper air flow path from the second, lower air flow path; and
    a second, flexible seal portion extending from the air deflector first portion in a direction toward the bumper beam, the flexible seal portion configured for sliding, sealing engagement with a surface of the bumper beam to accommodate build variation during vehicle assembly; wherein
        the second, flexible seal portion is made from a different material than the first portion of the air deflector,
        the first portion and second, flexible seal portion divert the airflow of the first air flow path to impede entry into a first spatial gap extending along the transverse and vertical axes of the vehicle engine compartment, the first spatial gap being disposed directly above the associated bumper beam, and
        the first portion and the second, flexible seal portion impede air of the first and second air flow paths from mixing together in a second spatial gap disposed directly behind the associated bumper beam.

2. The airflow directing assembly of claim 1 wherein the first portion and the second flexible seal portion of the air deflector are co-injected to form a single piece component.

3. The airflow directing assembly of claim 1 wherein the second, flexible seal portion is curved with respect to the first portion of the air deflector, and the second, flexible portion extends outwardly from the first portion.

4. The airflow directing assembly of claim 1 wherein the second, flexible seal portion is mounted to contact the bumper beam in a non-perpendicular orientation.

5. The airflow directing assembly of claim 1 wherein the second, flexible seal portion is made from a rubberized material.

6. The airflow directing assembly of claim 5 wherein the air deflector first portion is made from a rigid plastic material.

7. The airflow directing assembly of claim 6 wherein the air deflector first portion is made from a polypropylene material.

8. The airflow directing assembly of claim 1 wherein the second, flexible seal portion has a predetermined curvature that urges a terminal end of the second, flexible seal portion into abutting a sealing engagement with an interior portion of the bumper beam.

9. An air separator assembly for an associated vehicle engine compartment that defines transverse and vertical axes, the assembly comprising:
 an air deflector having a rigid, first portion that extends between and segregates first and second air flow paths through the associated vehicle engine compartment, the first portion purposefully offset and spaced from an associated bumper beam to accommodate vehicle component and assembly variation; and
 a second, flexible seal portion extending from the rigid first portion across the offset into abutting, sealing engagement with the associated bumper beam; wherein
  the rigid, first portion is made from a first material and the second, flexible seal portion is made from a different, more flexible second material,
  the first portion and second, flexible seal portion divert the airflow of the first air flow path so as to impede entry into a first spatial gap extending along the transverse and vertical axes of the vehicle engine compartment, the first spatial gap being disposed directly above the associated bumper beam, and
  the first portion and the second, flexible seal portion impede air of the second air flow path from mixing with air from the first air flow path in a second spatial gap disposed directly behind the associated bumper beam.

10. The air separator assembly of claim 9 wherein the rigid, first portion and the second, flexible seal portion are co-injected to form a single piece component.

11. The air separator assembly of claim 10 wherein the first material is a polypropylene.

12. The air separator assembly of claim 10 wherein the second material is a rubberized material.

13. The air separator assembly of claim 9 wherein the second, seal portion has a predetermined curvature whereby a terminal end of the seal portion is urged into a sealing engagement abutted to an interior portion of the associated bumper beam.

14. A method of forming an air separator assembly for an associated vehicle engine compartment that defines transverse and vertical axes, and includes an associated bumper beam where the airflow separator assembly separates airflow between first and second flow paths, the method comprising:
 providing an air deflector having a rigid, first portion and a flexible, second seal portion, the first portion and second, flexible portion being made of different materials; and
 mounting the air deflector in the vehicle engine compartment rearwardly of the associated bumper beam such that the air deflector extends between and segregates the first, upper air flow path from the second, lower air flow path,
 diverts air of the first air flow path from entering a first spatial gap extending along the transverse and vertical axis of the vehicle compartment, the first spatial gap being disposed directly above the associated bumper beam, and
 impedes air from the first and second air flow paths from mixing together in a second spatial gap disposed directly behind the associated bumper beam by the first and second seal portions.

15. The method of claim 14 further comprising curving the flexible, second seal portion so as to abut an interior portion of the associated bumper beam.

16. The method of claim 14 further comprising mounting the air deflector such that the flexible, second seal portion is in sliding, sealing engagement with a surface of the associated bumper beam.

17. The method of claim 14 wherein the providing step includes co-injecting the first and second seal portions to form a single-piece component.

* * * * *